March 17, 1970  R. J. WHITE  3,500,557
JOB IDENTIFICATION, LOCATION, PROGRAMMING, AND AUDITING SYSTEM
Filed July 9, 1968  4 Sheets-Sheet 2

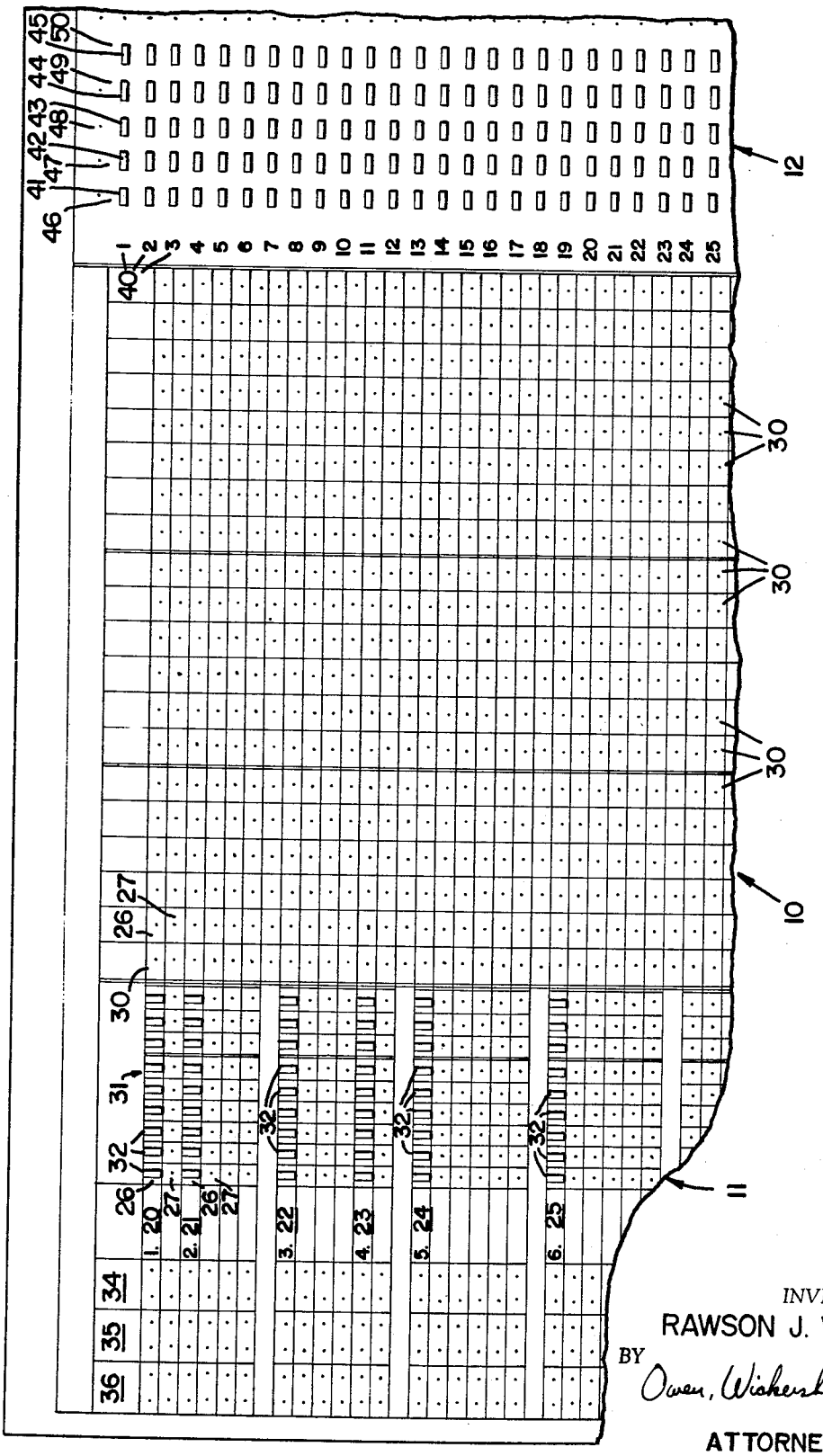
FIG_1

FIG_2

INVENTOR.
RAWSON J. WHITE
BY
Owen, Wickersham & Erickson
ATTORNEYS

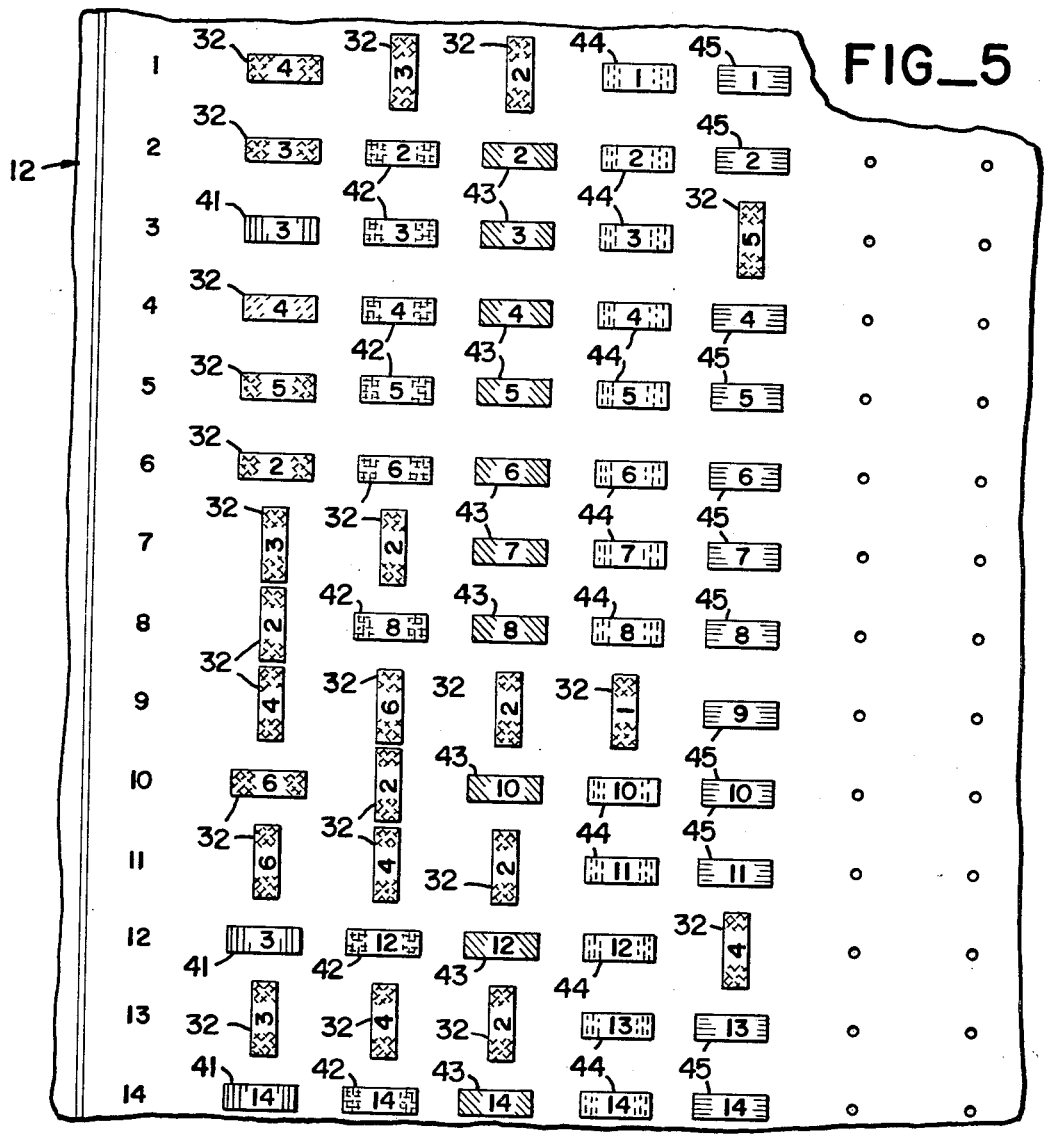
FIG_5
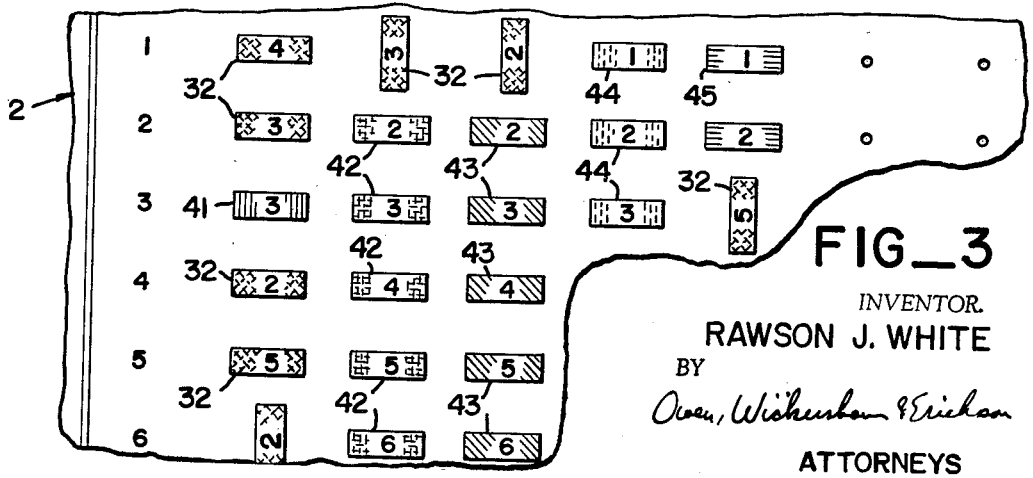
FIG_3
INVENTOR.
RAWSON J. WHITE
BY
Owen, Wickersham & Erickson
ATTORNEYS March 17, 1970  R. J. WHITE  3,500,557
JOB IDENTIFICATION, LOCATION, PROGRAMMING, AND AUDITING SYSTEM
Filed July 9, 1968  4 Sheets-Sheet 4

FIG_4

INVENTOR.
RAWSON J. WHITE
ATTORNEYS 3,500,557
Patented Mar. 17, 1970

1

3,500,557
JOB IDENTIFICATION, LOCATION, PROGRAMMING, AND AUDITING SYSTEM
Rawson J. White, 317 San Rafael Ave.,
Belvedere, Calif. 94920
Filed July 9, 1968, Ser. No. 743,353
Int. Cl. G09b 19/18
U.S. Cl. 35—24     12 Claims

ABSTRACT OF THE DISCLOSURE

A columnar job board is divided into job location and job number rows. Pieces denoting job locations and job numbers are normally aligned in rows of the same correspondence and are moved to rows in the other division as the work progress.

---

This invention relates to a system including both apparatus and method aspects for identifying, locating, programming, and auditing jobs in a shop having several employees.

Heretofore, such shops—an example is an automobile repair shop of a major dealer—have not been organized as systematically as they should be. Some men have occasionally been idle or have been working on jobs that have no particular priority rating, while at some time others were overloaded and found that they could not finish high-priority jobs on time. Even if all the men in the shop were practically equally efficient, still without proper management the shop itself tended to be inefficient, because the one who supposedly was in charge and was controlling the work was not properly aware of what was going on.

The present invention is directed to the solving of this and other problems. Thus, the invention enables the man in charge of the shop to audit his production payroll every thirty minutes, or other set time interval, and know what each man is doing and whether what he is doing is what should be done in the interests of efficiency and customer satisfaction. The invention also enables the one in control to program the production time of every man as the orders come in for the day. It gives quick visual reports of the availability of each man's production time and enables the proper selection of the right man to do the job. It enables positive follow-through on jobs which are delayed during waiting for parts that have been back ordered. It gives a visual signal for the kind of the work that the shop needs and it not having available. It enables a time check on all the car delivery commitments and a visual record of all the car locations at any time. It also enables a follow-through on jobs that are sublet to help assure delivery at the proper time. It enables control of reserve production time for jobs that are set by appointment.

In summary, the invention enables a complete production-man-hour control in a shop and better service-customer relations in the business.

All this is done through the use of a novel control board having two major divisions which are, in effect, cross indexed against each other. There is a major division which indicates job location as against time and another major division which indicates job numbers, either assigned or unassigned, and the controller can tell which job numbers have been assigned and which ones are not assigned. The operator, by moving pins, pegs, or other pieces removably supportable by the board, is able to keep complete control over the entire shop and, in a shop having so many employees that he could never remember what each man is doing, he can see at a glance things

2 that he should not even attempt to remember. The control board of this invention, when used by a simple system which embodies the method of the invention and is explained herein, displays visually the complete condition of the shop and enables the efficient operation of it to be expedited.

Other objects and advantages of the invention will appear from the following description of a preferred embodiment thereof.

In the drawings:

FIG. 1 is a fragmentary view in elevation of the portion of a pegboard form of control board embodying the principles of the invention and shown on a relatively small scale.

FIG. 2 is an enlarged view of the upper portion of the board of FIG. 1 showing a portion of one main division thereof, after some scheduling has been done.

FIG. 3 is a similar view showing a portion of the other main division thereof, at the same scheduling as in FIG. 2.

FIG. 4 is a view similar to FIG. 2 after more scheduling has been done.

FIG. 5 is a view similar to FIG. 3 with the same scheduling as in FIG. 4.

The invention comprises a control board 10 having two major divisions 11 and 12 and mounting a number of group-differentiated pieces, each class of which will be referred to below and explained. Although a pegboard is shown and described, since some specific form of the invention must be shown, and this is a preferred form, it should be understood that the control board could be a magnetic board, an adhesive board, a cork board, etc., and the removably supported pieces could be, instead of the pegs that are illustrated, magnet blocks, pins, adherent material and so on. The description is based on use of the device in connection with an automobile repair shop, also by way of example only, for it will of course be understood that the same invention can be used in connection with a radio repair shop or with an on-order manufacturing enterprise, and many other types of business having a plurality of employees with different types of jobs and with a series of jobs to be performed which are differentiated from each other and must be kept track of separately in some way.

In an automobile repair shop, when a customer enters, he may or may not have an appointment. Whether he does or not, one of the first things that is done after greeting him is to prepare a job sheet, which sets forth in writing what job or jobs are to be done and also usually gives an estimate of the time when the work will be completed. The present invention enables the foreman, shop manager, or other man in control of the shop to give this estimate much better than he normally would be able to, as will be appreciated after explanation of what is done.

The job programming section 11 is provided with a plurality of rows each indicating a particular department or a particular employee, preferably by department, each department having at least one employee assigned to it and perhaps several in some departments. For example, in an automobile repair shop there may be a sublet section 20 which is used to display the status of jobs that are sent out of the shop to one or more other locations, such as a body repair shop. There may also be a section 21 for lubrication, which may have one or more employees in it. There may be another section 22 for tune-up, which will have one or more employees generally assigned to that work. There may be a brake alignment section 23, an automatic transmission repair section 24 and a general repair section 25. For purposes of simplification, the drawings show only one man in each department but pace has been left in some departments to accommodate second man there. Other shops may have still other departments and each one will have one or more employees assigned to it. Even though a particular man may be capable of doing several or all of these jobs, the manager, in using this invention correctly, properly assigns such a man to the job that he does best or which is best for him to do in the interest of the general welfare of the shop, so that he specializes in the one thing. If, however, it is found that he is not being kept busy, then he is assigned jobs of another nature which he can do. The inspection of the board will show when that condition exists.

Each man is assigned, really, two rows, a main row 26 which comprises the jobs to which he is assigned and a special row 27 below the row 26 to enable the manager to use a series of expedite, inspection, or other signifying pegs or pieces where and when special controls are desired.

The job location section 11 is divided into a series of vertical columns 30 which cross all the rows. The most important group of these columns is the production hour schedule, which is preferably done for unit periods of, say, thirty minutes each, and these thirty-minute periods go across the board from the beginning of the work day plus the period (thus, if the work day begins at 8 a.m. and the production unit period is thirty minutes, the first one may be labeled 8:30 a.m.) right to the end of the day. If there is a half-hour period for lunch, the period between noon and 1 p.m. may comprise a single division, with the understanding that one half hour of that is work and the other half hour is the lunch period. Other adjustments may be made for different lunch periods or breaks if that is desired.

A portion 31 of the section 11 is provided for the storage of a sufficient number of job location pegs 32. These pegs 32 preferably have rectangular heads so that they can be turned either vertically or horizontally, and this may be used to give an indication of status; for example, jobs being worked on may be horizontal and jobs newly scheduled vertical. Each one of these pegs 32 has an indicium 33 on it, such as a numeral corresponding to the number of the particular employee or mechanic, and this number is shown on the board 10 in connection with his name.

There are also columns to the left of the work-hour schedule and peg storage 31, which are used to indicate special circumstances under which the work has to be unscheduled so far as that man is concerned, although the manager must still keep the control. Thus, for example, in an automobile repair shop there are three principal causes for stopping work, and one or more columns are provided for each of these causes: a "parts-procurement" column 34, a "necessary advice" column 35, and a "long delay on parts" column 36. The "parts procurement" column 34 for example, is used when the procurement of some part may take several hours or perhaps a day or two. The "long delay on parts" column 36 may indicate an order from a factory or overseas or something of that nature. The "necessary advice" column 35 would mean that the owner is to authorize the work before it proceeds. By inspection, the manager knows which jobs are in each category, if any.

The job locations section 11 is complemented by and cross-indexed by the job identification portion 12. In this there are a number of rows 40 which are preferably numbered serially, e.g., from 1 to 100 or 200, each row representing job number. These job numbers show on the job sheet which the mechanic prepares, and the numbers may be used over and over so long as the numbers are sufficient to encompass, say, one day's operation, or even one half day's operation where the jobs circulate more quickly. For each job number there is a series of differentiated pegs, 41, 42, 43, 44, and 45, each peg indicating by its color, preferably, or by some other indication, a priority, and each peg also bearing on it the number of the job. Thus all the pegs 41, 42, 43, 44, and 45 for job number 1, normally placed in row No. 1, have the number 1 on them, and none of these pegs is to be the same color as the employee identification or job location peg 32. Thus, a peg 32 having, say, orange color as an indicium that it is a job location peg, will not be confused with the pegs 41, 42, 43, 44, or 45, none of which is orange and which indicate the job number, even though the numbers on them may be the same.

Five priorities are preferably allotted, and if there are more jobs to be done on an individual car, then some pegs are reused, after others have been used. For example, in the vertical columns, the first column 46 indicates those jobs which are of the first priority, in other words, what is first to be done, the second column 47 the second priority, the third column 48 the third priority, the fourth column 49 the fourth priority, and the fifth column 50 the fifth priority. Before any work is assigned, and after each item is completed, the job number pegs are in their respective columns. For example, the first priority pegs 41, which may be red, are in column 46. The second priority pegs 42, which may be yellow, are in column 47; the third priority pegs 43, which may be green, are in column 48; the fourth priority pegs 44, which may be lavender, are in column 49; and the fifth priority pegs 44, which may be blue, are in column 50.

For example, suppose that job No. 1 is to have brake alignment, tune-up and lubrication; then one of those jobs is assigned to the first priority, another one to the second, and another one to the third. Depending on the condition of the shop, the controller or manager may choose to assign to brake-alignment the top priority, since it might take two hours, the tune-up second priority, since it might take another hour and a half, and the lubrication third priority, since it would take only half an hour. In that case, a red peg 41 from the column 46 would be used to indicate first priority, a yellow peg 42 from the column 47 to indicate the second priority job, and a green peg 43 from the column 48 to indicate the third priority job. Thus, when the controller looks at his pegboard 10 and sees a green peg 43 in a job location column 30, he knows that he has the amount of time displayed there sold for the day, but he also knows that though it may be presently in the first (e.g. 8:30 a.m.) position, where he normally would place it if it were the first such job scheduled for the day, the man assigned to it actually cannot do it at that particular time shown, because the car is not available to that man; it is being worked on in the brake alignment department.

To illustrate how the invention is used and something of the method of the invention, a short description will be given of what happens when a few cars are brought to an automobile repair shop, it again being understood that different kinds of shops may be involved with very similar procedure being used. Thus, let us suppose that the car comes into a shop which is just opening for the day and has no jobs from the preceding day at all. At that time, the board 10 will be set up as in FIG. 1, with all the job location pegs 32 in the proper section 31 in the row of each employee, and all the job number pegs 41, 42, 43, 44, and 45 arranged by their priority numbers opposite the job numbers. The first job into the shop may then be assigned to the job No. 1.

For the purpose of this discussion, assume that job No. 1 is to have brake alignment, tune-up, and lubrication. In that event, the foreman takes a red peg 41 from row 46 of job No. 1 and moves it to the job location section 11 and places it in a hole showing the time which it takes to do a brake alignment job, starting from the morning and supposing it is to be done the first thing. He has a schedule of the times that these jobs take or knows by inspection how long they take. If he does not know a particular job, he can estimate it at that time. One aid is that he usually has a manufacturer-furnished or consultant-furnished estimate of such jobs. Say that the job takes two hours, that this is the first job, and the shop is empty and it comes in so that it can be started at 8 o'clock; the job should then be finished at 10 a.m. So he places the red peg 41 for job No. 1 at 10 a.m. and sets it up vertically at first. Then immediately it will be indicated that this is assigned to man No. 4; so he takes a job location peg 32 from man No. 4 and inserts it vertically in the job No. 1 opening in column 46, where it replaces the red pin.

The next work to be done for job No. 1 is a tune-up; so he would take a yellow peg 42 from job No. 1 and, supposing that a tune-up is scheduled for one and one-half hours, would insert that peg 42 at 9:30 a.m. in the job location section. This does not mean the job will actually be done by 9:30, but it does indicate that an hour and a half of work is scheduled for that day for that department for man No. 3. He therefore takes a peg 32 for man No. 3 and puts it in the row for job No. 1 in column 47. He then takes the green peg 43 for job No. 1, representing the third priority, and places it at lubrication at the 8:30 a.m. spot. Again, the job will not be done by then, but it does indicate that one-half hour of lubrication work has been sold for man No. 2. That much done, he takes a job location peg 32 for No. 2 and places it in the third priority column 48 in the same job No. 1. With all this scheduling done, he may then actually assign the job to employee No. 4; when doing so, he preferably turns the red peg (which is at 10:30 a.m.) so that it is horizontal instead of vertical, and he also then turns the peg for man No. 4 under job No. 1 to the horizontal position to indicate that man No. 4 has actually been assigned that job and is presently working on it.

Assume that next a job comes in which is to have nothing but a tune-up done. Job No. 2 may be assigned. Since the job is for tune-up alone, the red peg for job No. 2 may be placed first at an hour and a half from the previous peg. Thus, the red peg 41 from job No. 2 may be placed at 11:00 a.m. and an orange peg 32 from man No. 3 would be placed in the column 46 for job No. 2; both of them still turned vertically. However, the controller instantly sees that job No. 1 is not available for work yet, whereas job No. 2 is, so that he reverses the pegs in the tune-up row for jobs Nos. 1 and 2, placing the red peg 41 for job No. 2 at the 9:30 location and the yellow peg 42 for job No. 1 at the 11 o'clock location. He may then assign the jobs and turn both the red peg 41 for No. 2 and the job location peg 32 for man No. 3 horizontally, indicating that both of these jobs are being worked on.

Assume next that an automatic transmission repair job comes in; it may be assigned job No. 3. Automatic transmission repair is done by man No. 5, and the red peg 41 for job No. 3 is placed at 4 p.m., since this job takes all day, and the job location peg 32 for man No. 5 is placed in column 46 at job No. 3. Then the job is assigned and the pegs turned horizontally. Now assume that the mechanic comes and says that parts needed for this job are not presently available in the parts department. In that instance the red peg 32 for job No. 3 is restored to its normal position, and a blue peg 45, although usually used for "fifth priority," may be used in this instance as a special signal and placed in the "parts procurement" column 35 in line with man No. 5, and the job location peg 32 for man No. 5 is in column 50 for job No. 3, both pegs being turned vertically, since they are not jobs that are actually being worked on; thus this gives an instant visual signal too.

After several other jobs come in, the board may appear as in FIGS. 4 and 5, every peg indexing the jobs and job locations for the shop manager and the board showing him the complete schedule as far as he has received jobs. FIGS. 4 and 5 show the following information.

Looking at the left-hand portion of the board from top to bottom, the chart shows first in row 20 that job No. 9 has a fourth priority portion sublet and due for return at 1:30 p.m. (It will be assumed that the time is now past 9 a.m. and that it it between 9 and 9:30 a.m.)

In the lubrication row 21, a series of jobs has been set up, one of which is due for completion at 9:30 a.m. and is being performed so that the peg for that one is horizontal. The first two lubrications are first priority jobs, as shown by red pegs 41 for job No. 6 and job No. 8, respectively, at 9:30 a.m. and 10 a.m. Yellow pegs 42 show that a couple of second priority jobs come next at 10:30 a.m. and 11 a.m., namely, jobs No. 7 and No. 10. Four third-priority jobs are shown as third priority by green pegs 43 for jobs Nos. 9, 1, 11, and 13. The time for lubrication is sold down through 1:30 p.m. The time from 1:30 p.m. is open and can still be purchased.

In the tune-up department, row 22, the time is sold through 2:30 p.m. with job No. 2 still being worked on, job No. 1 scheduled to be worked on next, and then jobs No. 7 and No. 13. Job No. 7 has a special attention peg 51 below it reminding the shop manager of some such thing as that, at the time, as soon as the job is finished, he is to call that man so that he can pick up his car.

In the brake alignment department, row 23, one job has had to be deferred for necessary advice from the customer, as shown by a blue peg 45 in column 35. For example, the customer may have thought that all he needed was to have aligning and it turned out that he needed complete new brake linings. He may have been telephoned and his secretary said that he was busy and would call later. When that advice is available, the job can be rescheduled. The peg 45 shows that this is part of job No. 12. In the same department row 23, job No. 1 is still being worked on, job No. 9 is scheduled to be ready at noon, job No. 11 is of the second priority, indicated by a yellow peg 42, and is scheduled to be completed at 2 p.m., and job No. 13 at 3:30 p.m. The time from 3:30 on is still available for sale.

In the automatic transmission department, row 24, job No. 3 is still waiting for parts as shown by its blue peg 45 in column 34, but another job has come in and is scheduled to be completed at 4 p.m., as shown by the red peg 41 for job No. 5. This job requires special following and so a white square peg 51 has been put on to enable that to be done.

In the general repair department, row 25, job No. 10 is scheduled to be completed at 10 a.m. and a special follow-up peg 51 is placed below it. Job No. 9, shown to be a second priority job by the yellow peg 42, is scheduled next if the car is ready at that time, and if it is not, it will be exchanged with job No. 11 where a red peg 41 is shown. The time beyond 1 p.m. is still available for sale.

Thus, a very good picture of what is going on in the shop is shown in the portion 11 of the chart 10.

As far as the job number section 12 is concerned, it will be seen that job No. 1, the first job, is still being worked on and is in department No. 4, as indicated by the job location peg for No. 4 being turned to a horizontal position and in the first priority position. From there it will go to location No. 3 and from there to location No. 2.

Job No. 2 is being worked on by man No. 3 in the tune-up department and when that is completed, the job will be done. Job No. 3 is waiting for a special situation, which in this case is waiting for parts, and the peg No. 5 in column 50 indicates that it is an automatic transmission job.

The return of the red peg to column 46 of job No. 4 indicates that that job has been completed. If it has not yet been delivered and the man calls, the manager knows instantly that it has been completed, and can deliver it.

Job No. 5 has only one thing to be done and that is being done in department No. 5, which is the automatic transmission department.

Job No. 6 is being worked on in the lubrication department and has nothing else to be done.

Job No. 7 has two things to be done, neither of which are yet being done, but both have been scheduled. The first is in the tune-up department No. 3 and then a lubrication for location No. 2.

Job No. 8 has a lubrication to be done, which is scheduled.

Job No. 9 has four things to be done. It goes first to department No. 4 for brake alignment, then to department No. 6 for some general repair, then to department No. 2 for lubrication, and then is to be sublet for, we shall assume, a body job, for which arrangements have been made so that at 1:30 p.m. it should be entirely completed, as will be seen by reference to the other side 11 of the chart.

Job No. 10 is being worked on in the general repair department and is being closely supervised. When it gets through there, it will be transferred to the lubrication department and when that is done, it will be completed.

Job No. 11 has three things to be done, all of which are scheduled and none of which are presently being worked on. It will need some general repair in department No. 6, some brake alignment in department No. 4, and lubrication in department No. 2.

Job No. 12 is being held up and, as shown on the other chart, the holdup is for necessary advice while the vertical peg at the end showing job location No. 4 indicates that it is the job concerning brake alignment.

Finally, job No. 13 has three things scheduled, none of which can presently be worked on. It is to go first for tune-up work, then to brake alignment, and then for a lubrication. This is the last job number that has so far been scheduled.

As the day goes on or as the department becomes more developed, the board 10 will become more complex, but the basic principles still apply. As jobs are completed, the job numbers are returned and are available for reassignment but usually it is best to run through a large number of them rather than to pull out individual ones just because they are available under the higher numbers. At all times, complete cross reference is available and complete control is obtained of the board.

As each job is completed, the mechanic reports back to the manager and the manager, for example, upon completion of the brake alignment job of job No. 1 takes the red peg out of that location and places it over into its original job number location, turned horizontally to indicate it had been done, and then he assigns the second priority matter to the man who is to do that job. In this instance, the yellow peg 42 is moved to the correct anticipation time. For example, suppose that although the shop opened at 8, no jobs came in at all until 9 a.m. If that were true, the first assignment would be made for appointments from the expected time of completion beginning with 9 o'clock instead of 8. Or in the more likely situation, when only a particular shop portion has been idle, the job would also be set down for the proper completion time at the time that that one is scheduled. Thus, if it is already 10 o'clock before a certain department begins a job, obviously one is not going to set a 9:30 stopping period. However, in the usual shop requiring this type of work, that will not be the problem, and if there is any such indication of idleness, it will show up instantly on the board and the manager will be able to assign to this worker what he should do.

Thus, the manager controlling the pegboard 10 can see instantly what each man is doing, how loaded he is, and what are the times of schedule, and he has a cross index of the job number and location so that he can see for any job number where the car is now and where it will go later or whether it is to go any other place. He also has the delay columns indexed against location and against the cars and by the turning of the pegs, a signal as to what work is in progress and what is simply scheduled.

It is a feature of the invention that the owner of the shop or general manager of the entire enterprise can supervise the foreman without asking questions and can tell the exact condition of the operation of the shop, so that he knows whether he is making money or not or whether the shop is being improperly run just by visual inspection.

As was said earlier, the board audits the production payroll every thirty minutes because of the visual exposure all across the board. Any peg which remains in the column where it is supposed to be completed after the time at which completion is scheduled represents a delinquent job and explanation is required. The controller immediately phones or walks over to the employee concerned and obtains the facts on this, which may mean rescheduling or may mean that that employee simply is not as fast as he should be. This enables the supervisor to see how the employees are doing their work.

It has also been seen how the board enables the programming of each man's production time as the orders come in for the day. Usually in a good shop the board will be filled by noon and usually there will be some jobs retained from the previous night which are available for scheduling. The scheduling may then be done at the time the shop closes or shortly before or, in some conditions, may be done during a night shift and toward the end of each shift the board 10 is set up for the next shift.

There is a quick visual report of what production is available for work, since all the time to the right of the last peg in every man's column shows exactly that.

It is easy to select the right man to do each job, since the men are classified on the chart, which is established by the manager, and since the time available is shown. Thus, if one man's time is over consistently, because of an abundance of this special type of job, it enables the manager to know that either he should get another employee or perhaps to move an employee who is in another department to that department temporarily or to schedule overflow from one man to another to enable the shop to keep up.

The positive follow-through on parts-delayed jobs has been commented on before. It is classified on the chart and again is established by the manager and is available for inspection at all times. When a car owner calls, by a glance at the chart the manager can answer the questions necessary.

A time check is given on all car delivery commitments by exposure, the blank to the right of the last peg or the blank for the whole man or whole department enables one also to determine what work the shop has time available for that it has not received.

There is a time check on all car delivery commitments by yellow square pegs 55 on the line beneath for pushing a job also.

A visual record of all car locations is attained at any time by looking at the job location panel, and the pegs are turned horizontally when they are working, so one knows exactly where each car is.

Sublet jobs are followed through to a delivery by following the sublet column. For appointments, each day upon beginning the setup of the board, the appointment schedule is arranged and proper pegs are out in location there, so that one does not run the risk of a man turning up and being told that the time is not available, and then finding out that the man had an appointment for having it at that exact time. The use of square pegs 55 in the second column for an apointment calendar is advisable for this instance. These are the same type of pegs that are used for job expedition or inspection of things and enable the controller's attention to be called to that at every time. Thus, there is a complete man-hour control of production in the shop and the business obtains better customer relations by having kept this record.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method of maintaining control over a large number of jobs in a multi-employee shop with the aid of a series of movable job location pieces and a series of movable job number pieces, comprising, initially arranging said job number pieces in a series of job number rows, said rows being arranged in columns by priority serial numbers for each job, so that each job number piece represents both a job number and a priority number of an operation to be performed on that job, initially arranging the job location pieces in a row according to the worker to do the job, for each operation of each job moving a job number piece from its initial location to a particular worker's row at a time corresponding to the time of completion from the beginning of the row, if no previous job number piece has been placed in that row or from the next preceding piece, if preceding pieces have been placed in that row, placing a job location piece in place of each job number piece in the space vacated by the job number piece by virtue of the preceding step, moving said job number pieces of higher priority into job location openings when a piece of lower priority is not able to be worked on, and restoring both job number and job location pieces for a particular job and job priority upon completion of a job.

2. The method of claim 1 using bi-directional pieces, wherein pieces denoting tentative scheduling are turned one way and pieces denoting work in process are turned another way, this procedure being following for both pieces in each operation of any job.

3. The method of claim 1 wherein each type of piece is given a color code for that type distinctive from each other type.

4. A method of maintaining control over a large number of jobs in a multi-employee shop with the aid of a control board and two sets of pieces removably supported by said board, said pieces being differentiated into a group of job location pieces and a group of job number pieces, comprising, initially arranging said job number pieces on said board in a series of job number rows, said rows being arranged in columns by priority serial numbers for each job, so that each job number piece represents both a job number and a priority number of an operation to be performed on that job, initially arranging the job location pieces on said board in a row according to the worker to do the job, for scheduling each operation of each job, moving a job number piece from its initial location to a particular worker's row at a time corresponding to the time of completion from the beginning of the row, if no previous job number piece has been placed in the row or from the next preceding piece, if preceding pieces have been placed in that row, placing a job location piece in place of each job number piece in the space vacated by the job number piece by virtue of the preceding step, moving said job number piece of higher priority into job location openings when a piece of lower priority is not able to be worked on, restoring, upon completion of each operation of a job, the two piece used in scheduling that operation to their original positions.

5. The method of claim 4 wherein, when a said job cannot be scheduled because of some factor necessitating delay, a job number piece therefor is placed in a special column in the job location row for the place when the job should be scheduled.

6. A job identification, location, programming, and auditing system, comprising a control board having rows and columns and divided into first and second major divisions, said first major division having a plurality of location rows, each corresponding to a workman and his work location, and a plurality of time columns each corresponding to a standard time period and arranged sequentially for a work day, said second major division having a plurality of job number rows, each corresponding to a particular job number, and a plurality of priority columns, each corresponding to a particular priority rating arranged serially, a plurality of job location pieces each carrying a first indicium reserved for indication of job location in general and a second indicium reserved for indication of a particular job location, said job location pieces normally being aligned with said location rows, a plurality of job location pieces for each said location row, a plurality of job number pieces, each carrying a third indicium of job number and a fourth indicium of priority rating, normally in said job location rows, said pieces and said board having cooperative means for removably retaining any said member at each intersection of each said column with each said row of said board, whereby, upon programming a job each job number piece is located in a particular location row and a particular time column and is, during scheduling and until completion of that job, replaced by a said job location piece.

7. The system of claim 6 wherein each said piece is provided with direction indication means for differentiating visually between two positions thereof at any location where it is installed.

8. The system of claim 6 wherein said job location pieces are all one color and all carry a job location number thereon and wherein said job number pieces all carry the job number with a differing color from said job location pieces and for each priority rating.

9. The system of claim 6 wherein said first major division has at least one "deferred action" column physically separated from said time columns by a section for storage of the job location pieces for each row.

10. The system of claim 6 having a set of distinctive pieces for special attention and whereon each said row in said first major division is separated from the next said row thereon by a special attention row enabling installation of said pieces when desired.

11. A job identification, location, programming, and auditing system, comprising a pegboard having peg openings in rows and columns and divided into first and second major divisions, said first major division having a plurality of location rows, each corresponding to a workman and his work location, and a plurality of time columns each corresponding to a standard time period and arranged sequentially for a work day, said second major division having a plurality of job number rows, each corresponding to a particular job number, and a plurality of priority columns, each corresponding to a particular priority rating arranged serially, a plurality of identically colored job location pegs each carrying a symbol indicating a particular job location, said job location pegs normally being aligned with said location rows, a plurality of job location pegs for each of said location row, a plurality of job number pegs, each job number being indicated on its pegs, each job number having a series of such pegs each of a different color to indicate priority rating, normally in said job location rows, all the pegs of any particular priority rating being the same color, whereby, upon programming a job each peg is located in a particular location row and a particular time column and is, during scheduling and until completion of that job, replaced by a said job location peg.

12. The system of claim 11 wherein said first major division has a peg storage portion for each said row for the job location pegs associated with that said row.

References Cited

UNITED STATES PATENTS 2,647,328    8/1953    Ostrander.
3,381,393    5/1968    Burk _____ 35—24

EUGENE R. CAPOZIO, Primary Examiner

W. H. GRIEB, Assistant Examiner